US007970020B2

(12) United States Patent
Hannu et al.

(10) Patent No.: US 7,970,020 B2
(45) Date of Patent: Jun. 28, 2011

(54) TERMINAL HAVING PLURAL PLAYBACK POINTERS FOR JITTER BUFFER

(75) Inventors: Hans Hannu, Luleå (SE); Per Synnergren, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1802 days.

(21) Appl. No.: 10/974,029

(22) Filed: Oct. 27, 2004

(65) Prior Publication Data

US 2006/0088000 A1   Apr. 27, 2006

(51) Int. Cl.
*H04J 3/06*   (2006.01)

(52) U.S. Cl. .......................... 370/516; 370/412; 370/429

(58) Field of Classification Search .................... None
See application file for complete search history.

(56) References Cited

U.S. PATENT DOCUMENTS

| | | |
|---|---|---|
| 5,157,728 A | 10/1992 | Schorman et al. |
| 5,371,787 A | 12/1994 | Hamilton |
| 5,450,410 A | 9/1995 | Hiuchyj et al. |
| 5,544,324 A | 8/1996 | Edem et al. |
| 5,553,071 A | 9/1996 | Aranguren et al. |
| 5,566,169 A | 10/1996 | Rangan et al. |
| 5,594,732 A | 1/1997 | Bell et al. |
| 5,594,734 A | 1/1997 | Worsley et al. |
| 5,606,562 A | 2/1997 | Landguth |
| 5,617,418 A | 4/1997 | Shirani et al. |
| 5,659,541 A | 8/1997 | Chan |
| 5,668,811 A | 9/1997 | Worsley et al. |
| 5,687,174 A | 11/1997 | Edem et al. |
| 5,699,481 A | 12/1997 | Shlomot et al. |
| 5,805,597 A | 9/1998 | Edem et al. |
| 5,862,343 A | 1/1999 | Landguth et al. |
| 5,999,525 A | 12/1999 | Krishnaswamy et al. |
| 6,064,673 A | 5/2000 | Anderson |
| 6,163,535 A | 12/2000 | Jordan et al. |
| 6,215,797 B1 | 4/2001 | Fellman et al. |
| 6,246,702 B1 | 6/2001 | Fellman et al. |

(Continued)

FOREIGN PATENT DOCUMENTS

EP   1 032 165 A1   8/2000

(Continued)

OTHER PUBLICATIONS

Petr et al, "Priority Discarding of Speech in Integrated Packet Networks", IEEE Journal on Selected Areas in Communications, vol. 7, No. 5, Jun. 1989, pp. 644-656.

(Continued)

*Primary Examiner* — Daniel J Ryman
*Assistant Examiner* — Tito Pham
(74) *Attorney, Agent, or Firm* — Nixon & Vanderhye, P.C.

(57) ABSTRACT

A terminal (30, 30B) receives transmissions in a form of a media stream. The terminal comprises a jitter buffer (40) which receives data comprising the media stream and a buffer manager (80). The buffer manager (80) makes a selection between plural playback pointers as an operative playback pointer from which the data comprising the media stream is played out of the jitter buffer. In an example implementation, the buffer manager (80) updates at least one of the plural playback pointers. The manner and timing of the updating of the least one of the plural playback pointers can occur in any of a variety of ways. The terminal (30, 30B) can take various forms, and may be (for example) either a wireless terminal which receives the media stream across a radio interface, or a wireline terminal.

20 Claims, 8 Drawing Sheets

U.S. PATENT DOCUMENTS

| | | |
|---|---|---|
| 6,247,072 B1 | 6/2001 | Firestone |
| 6,335,927 B1 | 1/2002 | Elliott et al. |
| 6,347,091 B1 * | 2/2002 | Wallentin et al. ............. 370/437 |
| 6,360,271 B1 | 3/2002 | Schuster et al. |
| 6,434,606 B1 | 8/2002 | Boella et al. |
| 6,438,702 B1 | 8/2002 | Hodge |
| 6,452,950 B1 | 9/2002 | Ohlsson et al. |
| 6,577,872 B1 | 6/2003 | Lundh et al. |
| 6,658,027 B1 | 12/2003 | Kramer et al. |
| 6,661,810 B1 | 12/2003 | Skelly et al. |
| 6,683,889 B1 | 1/2004 | Shaffer et al. |
| 6,684,273 B2 | 1/2004 | Boulandet et al. |
| 6,747,999 B1 | 6/2004 | Grosberg et al. |
| 6,862,298 B1 | 3/2005 | Smith et al. |
| 6,983,161 B2 | 1/2006 | Wesby et al. |
| 7,130,368 B1 | 10/2006 | Aweya et al. |
| 7,411,901 B1 * | 8/2008 | Alexander et al. ............ 370/230 |
| 2002/0007429 A1 | 1/2002 | Boulandet et al. |
| 2002/0026568 A1 | 2/2002 | Jeon |
| 2002/0075857 A1 | 6/2002 | LeBlanc |
| 2002/0101885 A1 | 8/2002 | Pogrebinsky et al. |
| 2002/0120749 A1 | 8/2002 | Widegren et al. |
| 2002/0141452 A1 | 10/2002 | Mauritz et al. |
| 2002/0167911 A1 | 11/2002 | Hickey |
| 2002/0181438 A1 | 12/2002 | McGibney |
| 2002/0191952 A1 * | 12/2002 | Fiore et al. ...................... 386/46 |
| 2003/0031210 A1 | 2/2003 | Harris |
| 2003/0112758 A1 | 6/2003 | Pang et al. |
| 2003/0152093 A1 | 8/2003 | Gupta et al. |
| 2003/0152094 A1 | 8/2003 | Colavito et al. |
| 2003/0169755 A1 | 9/2003 | Ternovsky |
| 2003/0185222 A1 | 10/2003 | Goldstein |
| 2003/0202528 A1 * | 10/2003 | Eckberg ......................... 370/412 |
| 2004/0022262 A1 * | 2/2004 | Vinnakota et al. ............ 370/429 |
| 2004/0037320 A1 | 2/2004 | Dickson |
| 2004/0057445 A1 | 3/2004 | LeBlanc |
| 2004/0062252 A1 | 4/2004 | Dowdal et al. |
| 2004/0062260 A1 | 4/2004 | Raetz et al. |
| 2004/0073692 A1 | 4/2004 | Gentle et al. |
| 2004/0076190 A1 | 4/2004 | Goel et al. |
| 2004/0076191 A1 | 4/2004 | Sundqvist et al. |
| 2004/0120309 A1 | 6/2004 | Kurittu et al. |
| 2004/0156622 A1 | 8/2004 | Kent, Jr. et al. |
| 2004/0258099 A1 | 12/2004 | Scott et al. |
| 2004/0268398 A1 * | 12/2004 | Fano et al. ...................... 725/88 |
| 2005/0007952 A1 | 1/2005 | Scott |
| 2005/0041692 A1 | 2/2005 | Kallstenius |
| 2005/0111819 A1 * | 5/2005 | Cormack et al. ................ 386/46 |
| 2005/0220240 A1 | 10/2005 | Lesso |
| 2005/0276411 A1 | 12/2005 | LeBlanc |
| 2006/0010472 A1 * | 1/2006 | Godeny .......................... 725/62 |
| 2006/0034188 A1 * | 2/2006 | Oran et al. ..................... 370/254 |
| 2008/0151881 A1 * | 6/2008 | Liu et al. ....................... 370/389 |
| 2008/0273857 A1 * | 11/2008 | Toyoda et al. .................. 386/65 |

FOREIGN PATENT DOCUMENTS

| | | |
|---|---|---|
| EP | 12155559 | 6/2002 |
| EP | 1427121 | 6/2004 |
| WO | 00/16509 | 3/2000 |
| WO | 00/42728 | 7/2000 |
| WO | 01/20828 | 3/2001 |
| WO | 01/50657 A2 | 7/2001 |
| WO | 02/13421 A2 | 2/2002 |
| WO | 02/054662 | 7/2002 |

OTHER PUBLICATIONS

Written Opinion of the International Preliminary Examining Authority mailed Aug. 23, 2005 in corresponding PCT Application PCT/SE2004/001150.

International Search Report mailed Mar. 25, 2002 in PCT Application PCT/SE01/02798.

International Preliminary Report on Patentability mailed Jan. 2003 in PCT Application No. PCT/SE01/02798.

David Mills, Internet Time Synchronization: the Network Time Protocol[1,2,3] Electrical Engineering Department University of Delaware, pp. 1-14.

Flavis Cristian, IBM Almaden Research Center, A Probabilistic Approach to Distributed Clock Synchronization, CH2706, 1989 IEEE, pp. 288-296.

Martin De Prycker et al., Terminal Synchronization in Asynchronous Networks, CH2424-0/87/0000-0800, 1987, IFFF, pp. 0800-0807.

William H. Press et al., Numerical Recipes in C: The Art of Scientific Computing, $2^{nd}$ Edition, Published by the Press Syndicate of the University of Cambridge, 1988, pp. 658-665.

OMA PoC User Plane, OMA-UP-POC=V0_1-20041005-D, Draft Version 1.0.9 Oct 2004.

Written Opinion and International Search Report mailed Jan. 30, 2006 in corresponding PCT application PCT/SE2005/001556.

* cited by examiner

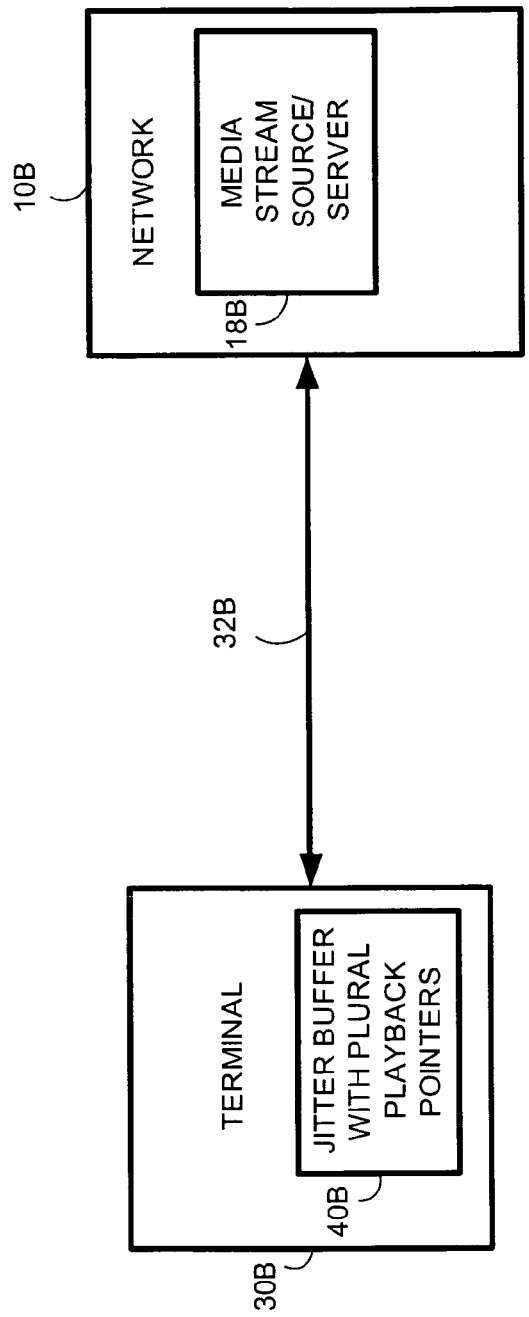

TERMINAL HAVING PLURAL PLAYBACK POINTERS FOR JITTER BUFFER

BACKGROUND

1. Field of the Invention

The present invention pertains to structure and operation of terminals which receive transmissions in the form of media streams.

2. Related Art and Other Considerations

Public Land Mobile radio Network (PLMN) is a generic term for a mobile wireless network that is centrally operated and administrated by an organization and uses land-based radio frequency transmitters or base stations as network hubs. PLMNs can stand alone and interconnect with one another or connect to a fixed system such as the PSTN.

In the near future there will be an increasing traffic load on the packet switched part of the PLMNs, such as GSM/GPRS, UMTS (WCDMA) and CDMA2000. One service that utilizes packet switched bearers is referred to as Push to talk over Cellular (PoC). Push to talk over Cellular (PoC) is currently being standardized and agreed upon in an industry consortium known as the Open Mobile Alliance (OMA) forum. See, OMA PoC User Plane, OMA-UP-POC=V0_1-20041005-D, Draft Version 1.0.9 Oct. 2004, incorporated herein by reference.

Push-to-talk over Cellular (PoC) is being developed for handsets in networks such as GSM/GPRS networks, EDGE networks, UMTS, and CDMA systems. PoC is basically a voice chat for cellular telecommunication systems. PoC provides quick one-to-one or group communication, providing something like a short instant messaging service which feels like "walkie talkies".

PoC enabled handsets will most likely be equipped with a PoC-button. The PoC button may (for example) be: a dedicated hardware button; an assigned button on a standard keypad; or, a software button used in e.g. pressure sensitive screens. When the PoC button is pressed, the handset is connected directly to another user or user group. The first releases of PoC provide half-duplex service, although full duplex may be available at a later stage.

Combinational services enrich the Circuit-Switched (CS) voice service of today, with images and video-clips. The images and/or video-clips would utilize the packet switched (PS) part of the PLMNs when being transferred from one user's client to another user's client.

Much effort and investment has been made to develop a fully packet switched solution for voice communication. Such solution is often referred to as Voice over IP (VoIP) since it is assumed that the Internet Protocol (IP) will be used to carry the media. Now this work will be reused to further enhance VoIP. It is anticipated that in the near future it will be possible to offer combinations of, for example, PoC with video and/or images, and VoIP with video and/or images, even over current deployed PLMNs.

Services that combine voice and image/video (regardless if the voice is packet switched or circuit switched) sometimes go under the name Push to Show services.

Devices that receive media streams (including media streams which are provided or are part of Push to talk over Cellular (PoC) and/or Push to Show services) generally have a buffer, commonly known as a jitter buffer, for temporary storage and (when necessary) reordering of packets. The jitter buffer typically serves to smooth out interruptions in the media stream in order to provide downstream equipment in the receiver, e.g., a speech decoder, with an essentially continuous stream of data. Conventionally the jitter buffer has a play out pointer which locates or identifies a position in the jitter buffer from which data of the media stream is to be read out or "rendered". Jitter buffers are generally known in the context of reception of media streams and elsewhere, as evidenced by the following (all of which are incorporated herein by reference in their entireties): US Patent Application Publication US 2003/0152093; US Patent Application Publication US 2004/0037320; US Patent Application Publication US 2004/0062260; US Patent Application Publication US 2004/0073692; US Patent Application Publication US 2004/0076190; US Patent Application Publication US 2004/0156622; US Patent Application Publication US 2002/0120749; U.S. Pat. No. 6,747,999; U.S. Pat. No. 6,684,273; U.S. Pat. No. 6,658,027; U.S. Pat. No. 6,418,125; U.S. Pat. No. 5,350,271.

Adaptive jitter buffers presently have only one single play out point that is estimated and changed during a session. This means that such jitter buffers have one algorithm that continuously tries to estimate the optimal amount of data that should be in the jitter buffer. One common approach is for the adaptive jitter buffer algorithm to use averages of statistical measures like standard deviation and variance to find out the optimal play out point for the jitter buffer for every point in time. The drawback is that such "averaging" algorithms do not react well to changes of channel settings, media settings or other settings that will abruptly change the characteristics of the transport or the media.

Algorithms for adaptive play out buffers commonly adapt the size of the buffer prior to the session, and try to keep the same buffer size from there on by adaptively changing either the transmission rate or the encoding rate of the media stream. The basic idea is that the receiving side is continuously sending information about its jitter buffer status to the streaming server. The streaming server can then adapt the rate of the media stream according to the received information. The drawback with the streaming approach is that it needs relatively large jitter buffers (in the order of a few seconds) to perform the adaptation due to the "rather slow" mechanism of reporting back the buffer status, which make this approach less useful for real-time services.

Applications utilizing the Real-time Transport Protocol (RTP) use the RTP Control Protocol (RTCP) for synchronizing RTP streams, for example an audio stream with a video stream as in video-telephony service. Real-time Transport Protocol (RTP) is described, e.g., in IETF, "RTP: A Transport Protocol for Real-Time Applications", RFC 3550, July 2003, incorporated herein by reference.

One problem is how to accurate set the media (e.g. audio, video, image) playback/rendering point to optimize the end-to-end (E2E) content delivery performance. This problem may arise in various situations. For example, the delay of the path of transfer may drastically change due to changes of transport related settings or states in the nodes involved in the transport. As a second example, the media type may change to a type that needs more or fewer bits in the jitter buffer to work properly. As a third example, a media type may be added during the media session, which call for added delay in the jitter buffer due to synchronization.

A channel type switch such as that which occurs in wideband code division multiple access (WCDMA) is one illustration of the first example problem situation for a packet switched audio service, such as VoIP or PoC. WCDMA is described, e.g., in 3GPP, "Technical Specification Group Radio Access Network; Radio Resource Control (RRC), Protocol Specification", TS 25.331 V4.13.0, March 2004. Consider FIG. 4, which depicts the Radio Resource Control (RRC) state machine of WCDMA. The RRC state starts up in idle mode. When data is to be transmitted, the RRC state may go to CELL_DCH or to CELL_FACH. When the transmitter throughput drops below a certain limit during a certain time period, a channel type down switch to CELL_FACH is executed. After yet some time without any new data the RRC state will switch down further to idle mode. However, if data is received prior to the down switch to idle mode, then depending on the amount of data (e.g., the Radio Link Control (RLC) buffer reaches a certain threshold), the RAB is switched to RRC state CELL_DCH. The problem for the audio is that some media will be transferred during the CELL_FACH state, and when the state switch occurs there will be a delay in the transmission of the media with the result of an annoying gap in the play out of audio to the recipient.

The PoC includes a concept called "user plane adaptation" which provides an illustration of the second example problem situation. The user plane adaptation algorithm collects information about the capacity of each terminal's downlink using the Session Description Protocol (SDP). From that information the PoC server informs all terminals of how much bandwidth the media stream can consume.

The way the bandwidth of the media stream is altered in PoC is by changing the number of speech coder frames in one IP packet. The SDP-parameter used for this purpose is a 'ptime' (packet time) parameter. The ptime parameter describes the amount of time the playback of the media in the IP packet will take. By altering the value of ptime from 20 ms to 160 ms, the bit rate of an IP stream conveying AMR5.15 frames can be reduced from 22.0 kbps to 7.6 kbps.

The implication for the jitter buffer when changing the ptime parameter is that the frequency of media reception is changed as well as the amount of media that is changed. Therefore different ptime values call for different jitter buffer depths. A drastic change of ptime may happen if Mobile IP handover is performed so that RObust Header Compression (ROHC) is enabled.

An illustration of the third problem situation occurs when a service is ongoing and sending one type of media and another media type is activated, e.g. a combination of VoIP and real-time video. Under such circumstances of adding a new media type, the play out point in the jitter buffer for the media stream may have to be changed. The reason is that video typically needs longer buffering time than voice. For instance, a low bandwidth scenario may have a video rate of four frames per second and therefore each frame corresponds to 250 ms of media. If the jitter buffer must hold three frames to achieve reasonable quality this means that 750 ms of video is stored in the jitter buffer. Therefore, when adding synchronized real-time video to VoIP the application has to delay the speech in the jitter buffer for as long as the buffering of the video stream by adjusting the play out point.

What is needed, therefore, and an object of the present invention, is an improved technique for reading out media stream data from a jitter buffer.

BRIEF SUMMARY

A terminal receives transmissions in a form of a media stream The terminal comprises a jitter buffer which receives data comprising the media stream and a buffer manager. The buffer manager makes a selection between plural playback pointers as an operative playback pointer from which the data comprising the media stream is played out of the jitter buffer. The terminal can take various forms, and may be (for example) either a wireless terminal which receives the media stream across a radio interface, or a wired terminal (e.g., wireline terminal).

In one example implementation, the buffer manager makes the selection between the plural playback pointers as a function of one or more of the following: (a) layer 2 interactions; (b) media type, (c) media settings; (d) service type; (e) time.

In an example implementation, the buffer manager updates at least one of the plural playback pointers. The manner and timing of the updating of the least one of the plural playback pointers can occur in any of a variety of ways. For example, the buffer manager can update the at least one of the plural playback pointers when the jitter buffer is receiving data comprising the media stream. Alternatively or additionally, the buffer manager can update the at least one of the plural playback pointers when the at least one of the plural playback pointers is the operative playback pointer.

In an example embodiment, updating of the at least one of the plural playback pointers can be as a function of at least one of: (1) estimated intervals of experienced path of transfer delays; (2) media type; (3) combination of media types; (4) services combinations.

In one example implementation wherein the media stream is acquired by the terminal at different times over channels of different channel type, the selection between the plural playback pointers as the operative playback pointer is based on the channel type of the channel which is carrying the media stream. For example, a first of the plural playback pointers is used for play out of the media stream when the media stream is acquired over a dedicated channel, and a second of the plural playback pointers is used for play out of the media stream when the media stream is acquired over a common channel.

In another example implementation, the selection between plural playback pointers is based on an amount of time that playback of a packet of the media stream will take. As an example, a determination regarding the amount of time that playback of a packet of the media stream will take makes involves by obtaining a parameter from the media stream, such as (for example) a ptime parameter of Session Description Protocol (SDP).

In yet another example implementation, the selection between plural playback pointers depends on whether plural types of media are included in the media stream. For example, a first of the plural playback pointers is used for play out of the media stream when only one type of media (e.g., audio) is included in the media stream, whereas a second of the plural playback pointers is used for play out of the media stream when more than one type of media (e.g., video combined with the audio) is included in the media stream.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1B is a schematic view of a generic wireline system which serves as an a second example context in which the present invention may be employed.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1A:
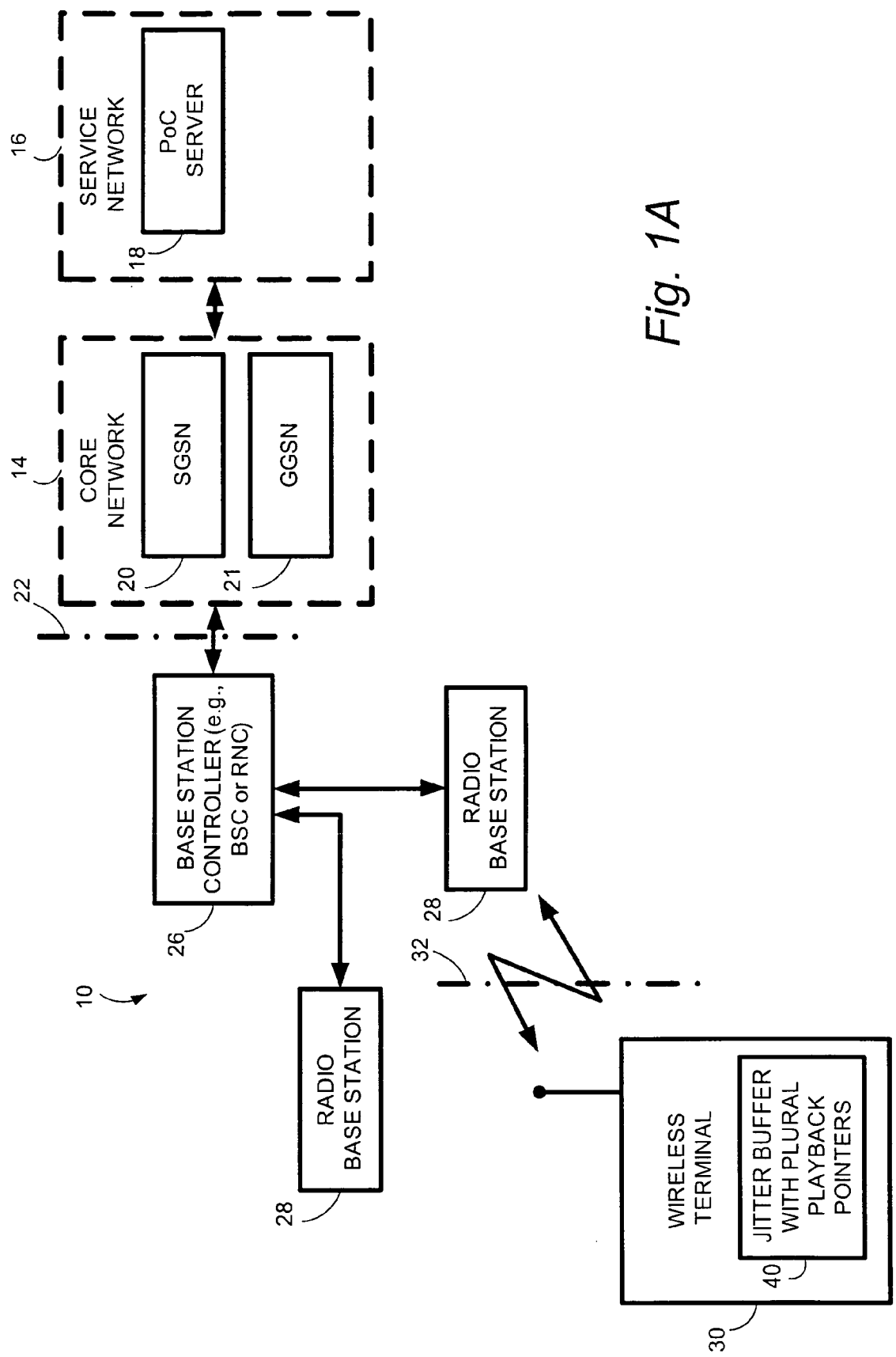
FIG. 1A is a schematic view of a generic telecommunications system with a radio access network which serves as a first example context in which the present invention may be employed.

FIG. 1A illustrates a generic telecommunications system as a first example context in which the present invention may be employed. The first example system includes both a radio access network 10 and a core network 14. The core network 14 is shown as being connected to a service node or service network 16. The service network 16 (or other comparable entity) includes a PoC Server 18 which facilitates the Push to talk over Cellular (PoC) service previously described.

In one specific example implementation the core network 14 is a connectionless external core network and comprises Serving GPRS Support Node (SGSN) 20 and Gateway GRPS support node (GGSN) 21. The General Packet Radio Service (GPRS) Service (SGSN) node 20 is tailored to provide packet-switched type services. The Gateway GRPS support node (GGSN) 21 provides the interface towards the packet-switched networks (e.g., the Internet, X.25 external networks). The Gateway GRPS support node (GGSN) 21 translates data formats, signaling protocols and address information in order to permit communication between the different networks. Serving GPRS Support Node (SGSN) 20 provides packet routing to and from a SGSN service area, and serves GPRS subscribers which are physically located within the SGSN service area. Serving GPRS Support Node (SGSN) 20 provides functions such as authentication, ciphering, mobility management, charging data, and logical link management toward the user equipment unit. A GPRS subscriber may be served by any SGSN in the network depending on location. The functionality of Serving GPRS Support Node (SGSN) 20 and Gateway GRPS support node (GGSN) 21 may be combined in the same node, or may exist in separate nodes as shown in FIG. 1A.

The core network 14 connects to radio access network 10 over a radio access network interface depicted by dot-dashed line 22. The radio access network 10 includes one or more control nodes 26 and one or more radio base stations (BS) 28. In an example, non-limiting implementation in which radio access network 10 is a UMTS Terrestrial Radio Access Network (UTRAN), the radio access network interface depicted by dot-dashed line 22 is known as the Iu interface, and the control nodes 26 take the form of radio network controllers (RNCs). In other implementations of radio access network 10, the control nodes 26 can have other names, such as base station controller (BSC), for example. In any event, it should be understood that, for sake of simplicity, the radio access network 10 of FIG. 1A is shown with only one control node 26, with the control node 26 being connected to two base stations (BS) 28. As understood by those skilled in the art, the radio access network 10 typically has numerous control nodes 26, which can be connected over an unillustrated interface (such as an Iur interface). Again for sake of simplicity, only two base station nodes 28 are shown connected to the representative control node 26. It will be appreciated that a different number of base stations 28 can be served by each control node 26, and that control nodes 26 need not serve the same number of base stations. Further, those skilled in the art will also appreciate that a base station is sometimes also referred to in the art as a radio base station, a node B, or B-node.

For brevity it is assumed in the ensuing discussion that each base station 28 serves one cell. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

A wireless terminal 30 communicates with one or more cells or one or more base stations (BS) 28 over a radio or air interface 32. In differing implementations, the wireless terminal 30 can be known by different names, such as mobile station or MS, mobile terminal or MT, or user equipment unit (UE), for example. Of course, whereas for ease of illustration only one wireless terminal 30 is shown in FIG. 1A, each base station typically serves many wireless terminals.

In the example UMTS implementation mentioned above, radio access is preferably based upon Wideband, Code Division Multiple Access (WCDMA) with individual radio channels allocated using CDMA spreading codes. Of course, other access methods may be employed.

Of particular interest herein is the fact that, for or in conjunction with services such as Push to talk over Cellular (PoC), the wireless terminal 30 has a jitter buffer 40 which has plural playback pointers, as hereinafter described.

Figure 2A:
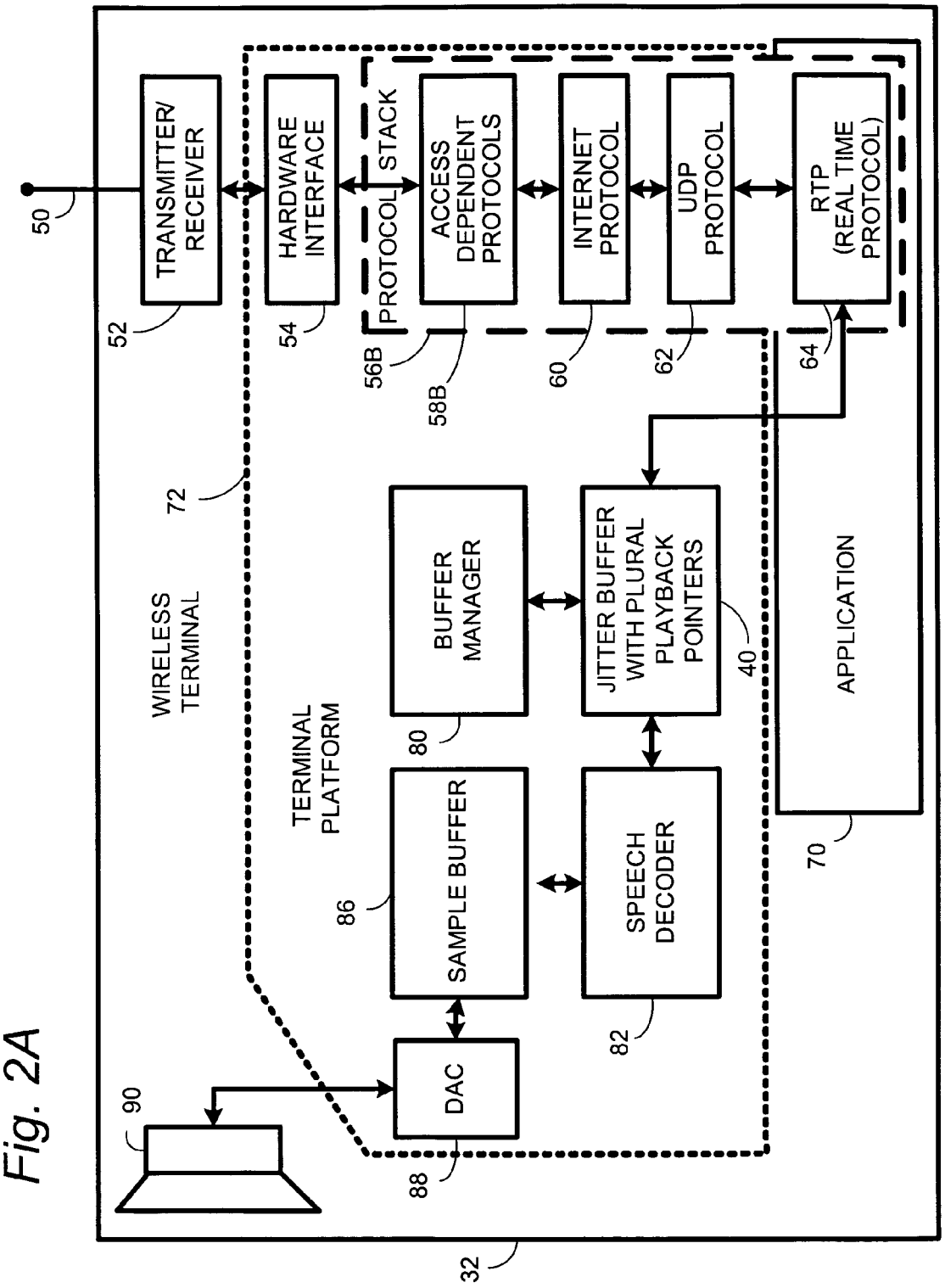
FIG. 2A is a schematic view of example constituent components of a generic representative wireless terminal according to an example embodiment.

Example constituent components and functionalities of a generic representative wireless terminal 30 are illustrated in FIG. 2A. The generic representative wireless terminal 30 comprises an antenna 50 which connects to a transmitter/receiver 52. The transmitter/receiver 52 is connected through a hardware interface 54 to a protocol stack 56. Frames of a media stream received over the air interface 31 by transmitter/receiver 52 are processed by protocol stack 56. The protocol stack 56 generally includes access dependent protocols; internet protocol; a transport protocol; and, an application protocol. The particular example protocol stack 56 shown in FIG. 2A happens to include Access dependent protocols 58; Internet Protocol 60; UDP Protocol 62 (as the transport protocol); and Real Time Protocol (RTP) 64 (as the application protocol). The protocol stack 56 can be constructed differently in other implementations.

UDP (User Datagram Protocol) 62 is a transport service which is provided to a software application (such as application 70) that uses an IP network for communication. The UDP transport service provides additional functionality on top of the IP network transport function. UDP transport service operates end-to-end on a data flow. The UDP protocol 62 is not involved in intermediate nodes in the IP network, only the nodes where the data flow originates and terminates.

The Real Time Protocol (RTP) 64 is performed by an application 70. The application 70, like various other functionalities of a terminal platform portion 72 of wireless terminal 30 (including protocols in protocol stack 56), is preferably executed by one or more processors which comprise wireless terminal 30. In some example implementations, application 70 and jitter buffer 40 may be integrated into terminal platform 72. The application 70 serves, e.g., to remove RTP headers and to pass a frame and a timestamp of the frame to jitter buffer 40. Examples of applications which perform such functions are: network audio conferencing tools; network video conferencing tools; IP telephony tools; and packet switched streaming tools The terminal platform portion 72 of wireless terminal 30 includes the jitter buffer 40 which operates under control of a buffer manager 80. The jitter buffer 40 is preferably implemented in software (e.g., by instructions executed by one or more of the processors comprising wireless terminal 30), and uses hardware memory allocated to application 70 when running on terminal platform portion 72. Under control of buffer manager 80, jitter buffer 40 stores data of the media stream in a way to smooth out interruptions in the media transfer, thereby preferably feeding speech decoder 82 with a continuous stream of data. Also, jitter buffer 40 operating under control of buffer manager 80 performs re-ordering of packets (if needed), and removes or discards duplicate frames by using the timestamps of the frames.

In addition to the plural playback pointer feature described herein, the jitter buffer 40 may optionally have other capabilities or characteristics such as being adaptive, e.g., adjusting its depth according to one or more characteristics of the channel over which the media stream is received. Service knowledge may be utilized as input to the jitter buffer 40 or to buffer manager 80 to help with certain tasks such as determining with how many packets jitter buffer 40 should be filled to secure the continuous stream of data from jitter buffer 40.

The terminal platform portion 72 of wireless terminal 30 may also include a sample buffer 86 which is connected between speech decoder 82 and digital to analog converter (DAC) 88. In an example implementation, sample buffer 86 can buffer at least one hundred sixty samples of speech with 8 kHz audio bandwidth between the speech decoder 82 and digital to analog converter (DAC) 88, and may be even larger in order to hold a few extra milliseconds of speech. For VoIP, the sample buffer 86 can be on the order of 480 samples, and for PoC the sample buffer 86 can be over 1000 samples (160 samples=20 milliseconds). The digital to analog converter (DAC) 88 is connected to media playback device(s) 90, such as a speaker or head-set (perhaps via, e.g., an amplifier).

FIG. 1B illustrates a wireline network as a second example context in which the present invention may be employed. The second example system includes a network node 10B which comprises a media stream source or media stream server 18B. The network node 10B is connected to terminal 30B over a wireline communication link 32B.

Figure 2B:
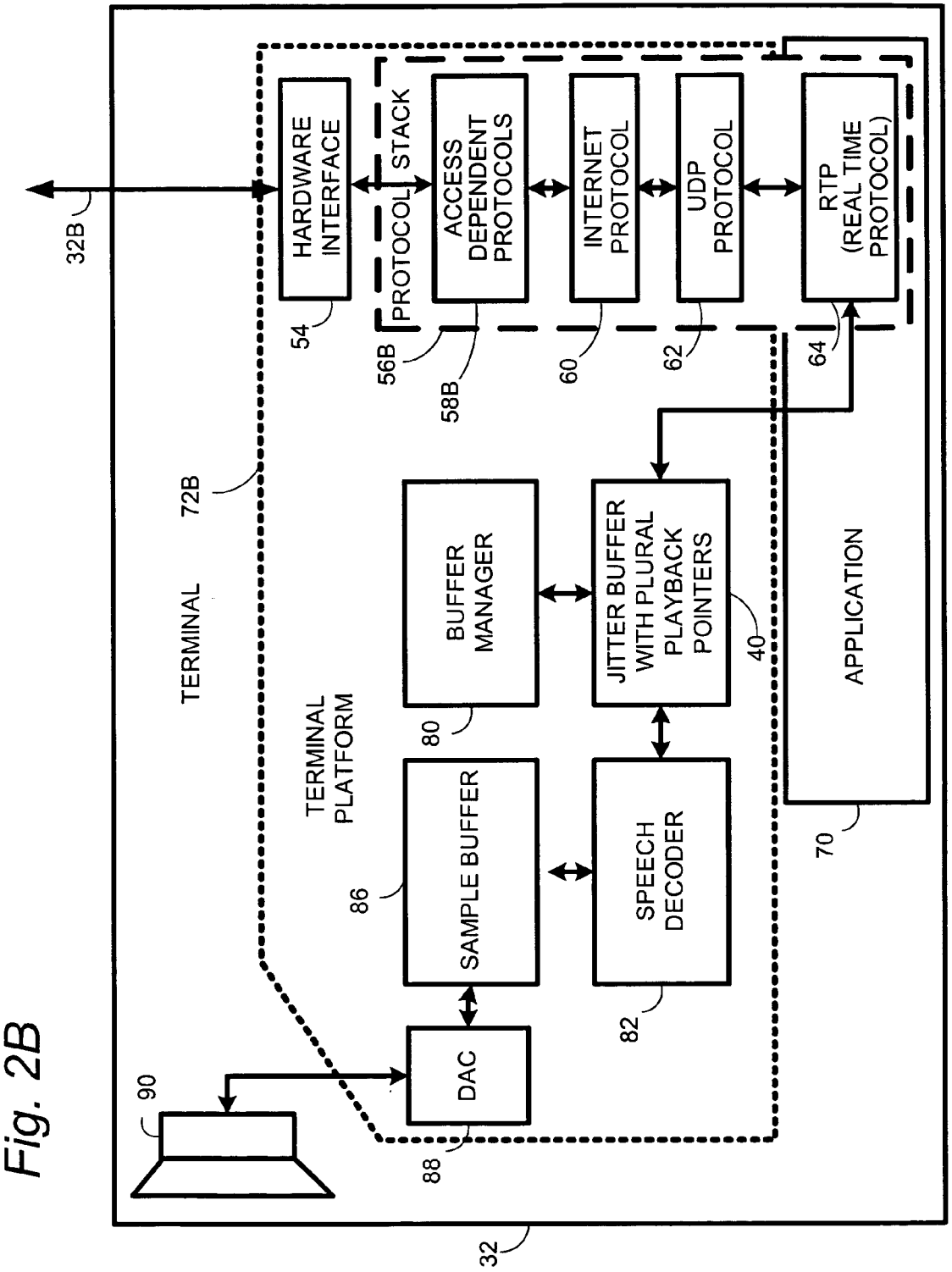
FIG. 2B is a schematic view of example constituent components of a generic representative wireless terminal according to another example embodiment.

As shown in FIG. 2B, the terminal 30B of the FIG. 1B example context resembles wireless terminal 30 of FIG. 2A with various exceptions. As examples of the exceptions, the wireline communication link 32B which serves as the interface to the network node 10B connects to a hardware interface 54B of terminal 30B. In addition, terminal platform 72B of terminal 30B comprises a protocol stack 56B. The protocol stack 56B of terminal 30B may have one or more protocols that differ from the protocol stack illustrated in FIG. 2A. For example, the protocol stack 56B of FIG. 2B may differ by having a different set of access dependent protocols 58B. For the case of the terminal being connected by a wired network, the access dependent protocols 58B may be, for example, "MAC_client (802 specific)/MAC (802.3 specific)/Physical_layer" when the wired network includes Ethernet (IEEE 802.3). In other respects, the remaining components of terminal 30B and operation thereof are essentially similar to like numbered components of terminal 30A, including jitter buffer 40.

In other embodiments, whether wireless or wireline connection, the protocol stack may have a different composition depending, e.g., upon the nature of the particular access technology (e.g., GSM/GPRS, WCDMA, Ethernet, etc). For example, for a GSM/GPRS system the protocol stack for the terminal would be essentially the same as that of FIG. 2A, but with the access dependent protocols 58 being "GSM_RF (physical layer)/MAC/RLC/SNDCP". As an aside, the person skilled in the art will understand that often various additional techniques are employed to make Internet Protocol useful for mobile terminals, such as compression, P-headers in SIP, and so forth.

Since it is apparent that the terminal may take either wireless or wireline forms, it should also be apparent that the terminal may be any of myriad devices or appliances, such as mobile phones, mobile laptops, pagers, personal digital assistants or other comparable mobile devices, SIP phones, stationary computers and laptops equipped with a real-time application, such as Microsoft netmeeting, Push-to-talk client etc.

Figure 3:
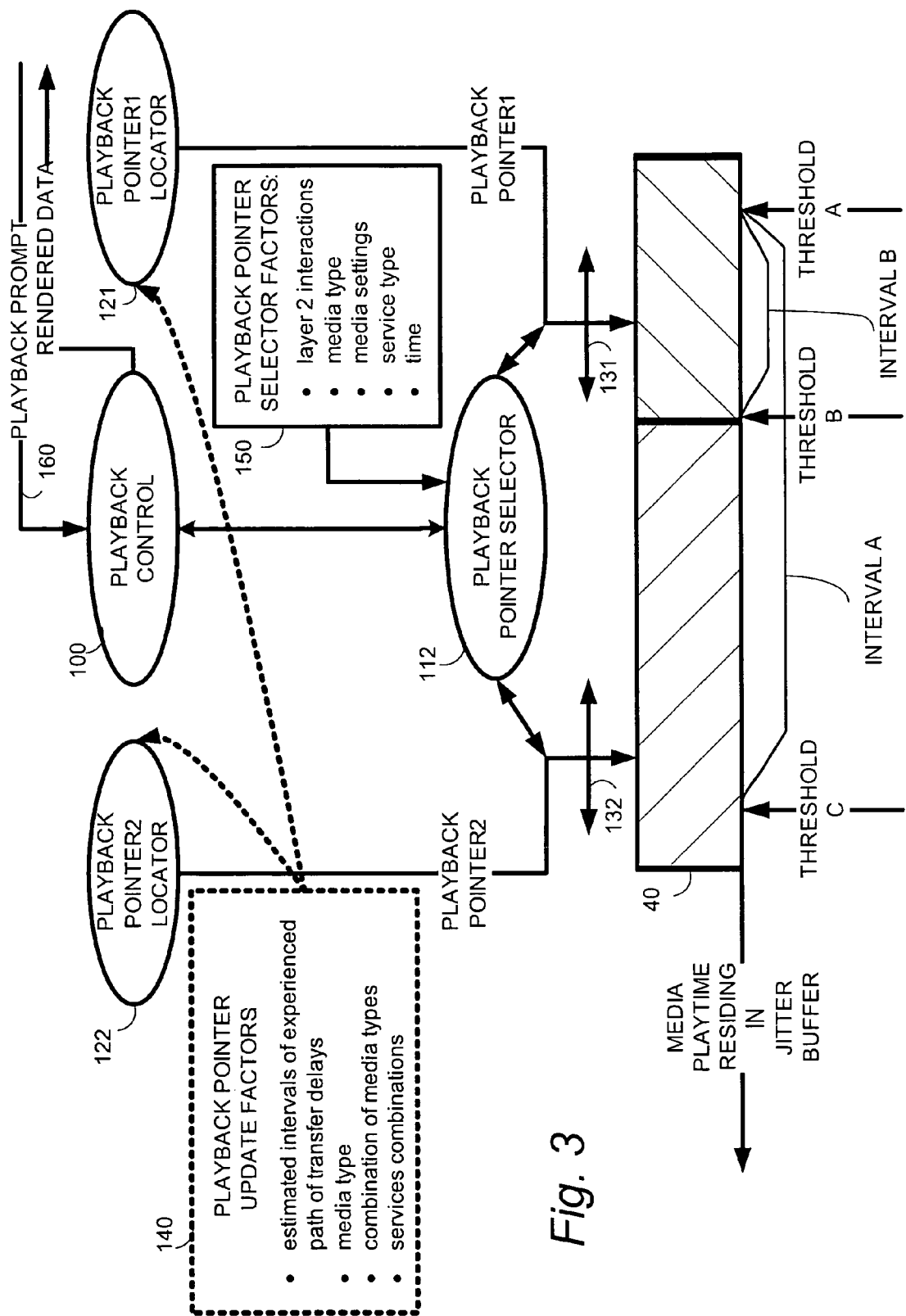
FIG. 3 is a diagrammatic view illustrating a plural playback pointer aspect of a jitter buffer and certain logic executed by a buffer manager in controlling jitter buffer.
Figure 3A:
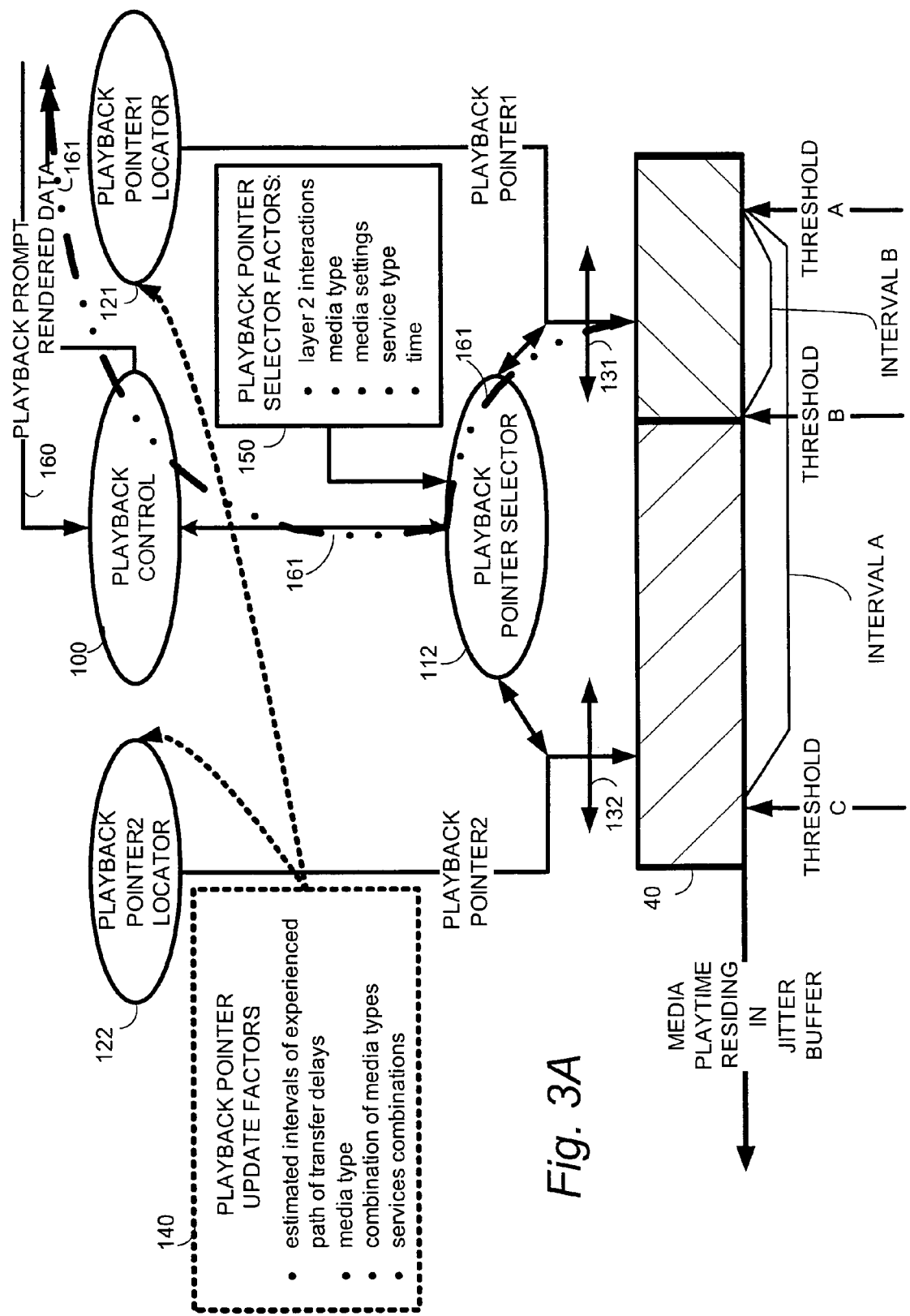
FIG. 3A is a diagrammatic view illustrating selection of a first of plural playback pointer as an operative playback pointer.
Figure 3B:
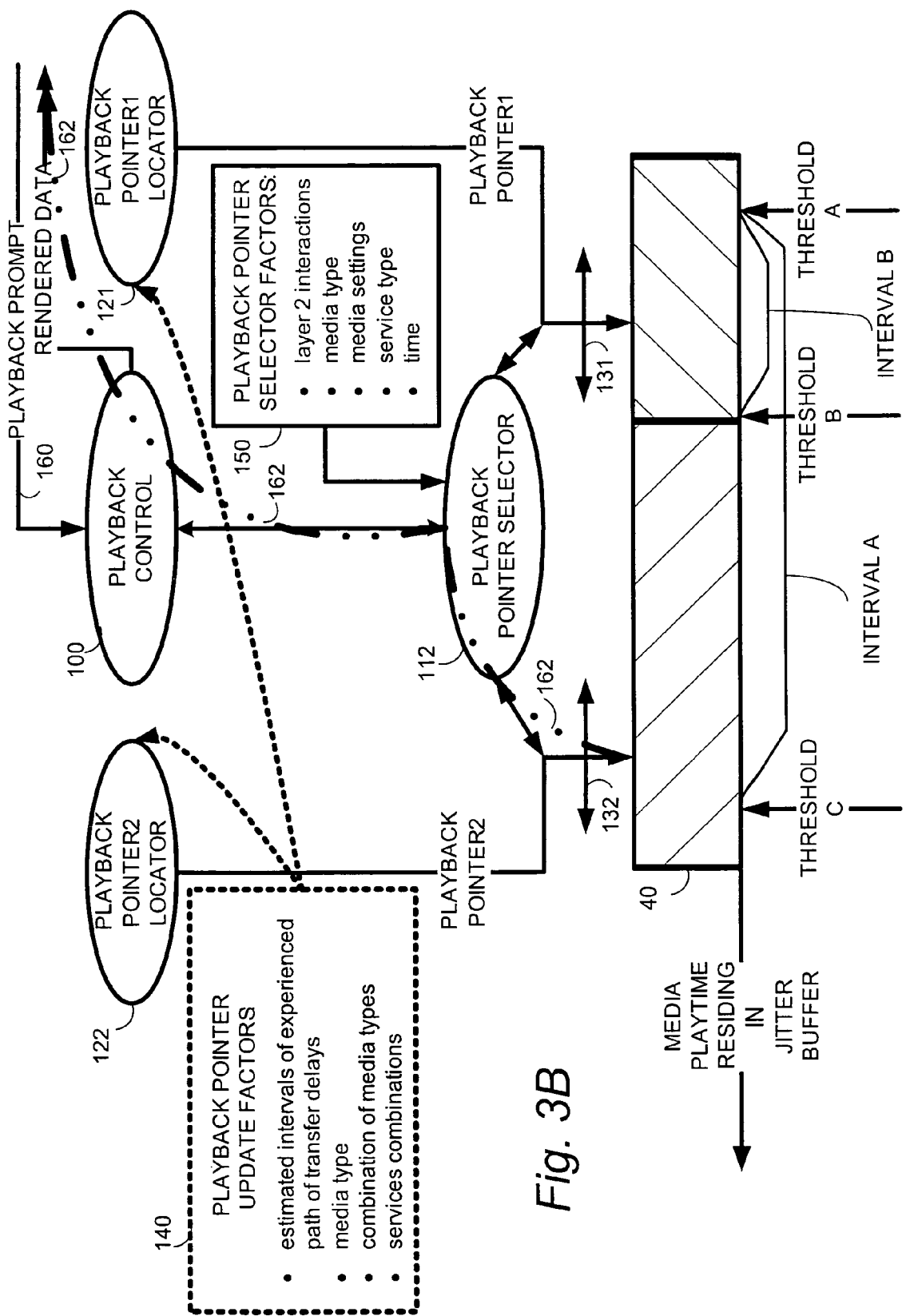
FIG. 3B is a diagrammatic view illustrating selection of a second of plural playback pointer as an operative playback pointer.

FIG. 3, FIG. 3A, and FIG. 3B, illustrate the plural playback pointers aspect of jitter buffer 40 and certain logic executed by buffer manager 80 in controlling jitter buffer 40, and particularly in controlling the plural playback pointers. Hereinafter, description of the jitter buffer 40 and its operation is, unless otherwise excepted specifically or by context, applicable to either the wireless terminal 30 (of FIG. 2A and the context of FIG. 1A) or the wireline terminal 30B (of FIG. 2B and the context of FIG. 1B). The particular embodiment of buffer manager 80 shown in FIG. 3 includes a playback control function 100 and a playback pointer selector 112.

FIG. 3 further shows jitter buffer 40 as having two playback pointers, i.e., playback pointer1 and playback pointer2. It will be appreciated that the technology disclosed herein concerns plural playback pointers, and that for convenience only two playback pointers have been illustrated in FIG. 3. Yet the person skilled in the art will readily understand that two or more playback pointers may be provided and operate as herein described.

Buffer manager 80 has a locator function for each of the playback pointers. In particular, for playback pointer1 the buffer manager 80 includes a playback pointer1 locator function 121 and for playback pointer2 the buffer manager 80 includes a playback pointer2 locator function 122. For whichever of the playback pointers is selected to be operative at the moment, the respective playback pointer locator function points to, keeps track, or indicates the position in jitter buffer 40 from which the media stream is to be retrieved, read, or rendered.

The position in jitter buffer 40 from which the media stream is to be retrieved can be expressed in terms of time, bytes, or number of frames, for example. In the computer/ terminal or processor comprising the terminal platform, there is a memory pointer that points to a start or beginning of the buffer as well as the playback pointer. The playback pointer points a certain number of bytes from the start of the buffer. So when data fills up the jitter buffer 40 to the position indicated by the playback pointer, such triggers removal and sending of data from the jitter buffer 40 to the speech decoder 82.

As an optional feature, one or more and preferably both of the playback pointers are adjustable to point to different locations in jitter buffer 40 at different times. This adjustability is illustrated in FIG. 3 by arrow 131 for playback pointer1 and arrow 132 for playback pointer2, which show the capability for the playback pointers to move along the jitter buffer 40. In view of this adjustability feature, the playback pointers can be updated based on various update factors, as illustrated by update factor input(s) 140. In the illustrated example embodiment, updating of the at least one of the plural playback pointers can be a function of at least one of: (1) estimated intervals of experienced path of transfer delays; (2) media type; (3) combination of media types; (4) services combinations. Any one or any combination of the update factors may be utilized, or other factors which may prove germane to playback pointer location. In view of the optional nature of this playback pointer updating or adjustability feature, the update factors are shown by dotted lines as inputs to playback pointer1 locator function 121 and playback pointer2 locator function 122. While shown as emanating from the same drawing block 140 in FIG. 3, it should be understood that the playback pointer update factors that are input to playback pointer1 locator function 121 may be different from the playback pointer update factors that are input to playback pointer2 locator function 122.

FIG. 3 also illustrates three thresholds. Threshold A is a threshold for minimum jitter buffer playback point setting, e.g. system/service default. In this example, this is the minimum value that playback pointer1 and playback pointer2 can have. Threshold B is maximum value of playback pointer1, and thus can be (for example) a threshold for maximum jitter buffer playback point when a dedicated channel is used. Threshold C is a threshold for maximum possible value of playback pointer2, e.g. system/service default.

FIG. 3 further illustrates two intervals. Interval A is an interval in which playback pointer1 can vary. Interval B is an interval in which playback pointer2 can vary.

Which of the playback pointer1 and playback pointer2 is operative at any given moment in time is determined by playback pointer selector 112. The playback pointer selector 112 of buffer manager 80 thus makes a selection between the plural playback pointers (e.g., playback pointer1, playback pointer2, and any other playback pointers) to determine an operative playback pointer from which the data comprising the media stream is played out of the jitter buffer 40. In one example implementation, the playback pointer selector 112 of buffer manager 80 makes the selection between the plural playback pointers as a function of one or more of the following: (a) layer 2 interactions; (b) media type, (c) media settings; (d) service type; (e) time. These playback point selector factors are shown as input to playback pointer selector 112 from selector factor box 150 in FIG. 3.

In operation, frames of a media stream are received and passed through the protocol stack 56. For the wireless terminal of FIG. 1A, the frames of the media stream are received over air interface 30 by the receiver portion of transmitter/receiver 52 and sent to the protocol stack 56 via hardware interface 54. For the wireline terminal 30B of FIG. 1B, the frames of the media stream are received over the wire link 18B by hardware interface 54B and applied to protocol stack 56B. The application 70 serves, e.g., to remove RTP headers and to pass a frame and a timestamp of the frame to jitter buffer 40. The jitter buffer 40 has plural playback pointers, such as playback pointer1 and playback pointer2 shown in FIG. 3.

When a device such as speech decoder 82 (which is fed by jitter buffer 40) is ready for further data from the media stream, playback control function 100 of buffer manager 80 receives a playback prompt as indicated by playback prompt arrow 160 in FIG. 3. The playback control function 100 then fetches, reads, or renders the data of the media stream in jitter buffer 40 to the position indicated by which ever of the playback pointers is the operative playback pointer. The playback pointer selector 112 determines which of the plural playback pointers is the operative playback pointer, e.g., either playback pointer1 or playback pointer2. The determination made by playback pointer selector 112 is based on pointer selection factors such as one or more of the factors shown as inputs 150.

Data from the media stream is then rendered from the position indicated by the operative playback pointer. Should the playback pointer selector 112 determine that playback pointer1 is the operative playback pointer, then data obtained from the position indicated by playback pointer1 is read out from jitter buffer 40 and utilized as the rendered data which is applied to the next device (e.g., speech decoder 82), as depicted by dashed-double dotted line 161 in FIG. 3A. On the other hand, Should the playback pointer selector 112 determine that playback pointer2 is the operative playback pointer, then data obtained from the position indicated by playback pointer2 is read out from jitter buffer 40 and utilized as the rendered data which is applied to the next device, as depicted by dashed-double dotted line 162 in FIG. 3B. FIG. 3A and FIG. 3B are not necessarily intended to illustrate an exact path of data travel, but rather the selective readout or rendering of data from jitter buffer 40 in accordance with the choice of an operative playback pointer.

In one example implementation in which media is acquired at different times over a dedicated channel and a common channel. In such example implementation, playback pointer1 can be the playback pointer utilized for a dedicated channel. In one example version of this implementation, the playback pointer1 can be set with input from the estimated jitter during a talk-burst considering the jitter. Such can be done by looking at the time of arrival and the RTP timestamp. On the other hand, in such example implementation the playback pointer2 can be the playback pointer utilized for the common channel. In one example version of this implementation, the playback pointer2 can be set with input from an estimation of the channel-switch. The estimation can be done by looking at a glitch in time when channel-switching is anticipated (see threshold B of FIG. 3).

As mentioned above, the playback pointer1 can be set with input from the estimate jitter during a talk-burst considering the jitter, by looking at the time of arrival and the RTP timestamp. The RTP protocol has a RTP timestamp which uses a "sample" clock. If 160 samples are sent, then the RTP timestamp field is incremented by 160. For example, the first packet has a timestamp of 160; the second packet has a timestamp of 320; the third packet has a timestamp of 480; and so forth. In view of the known sampling frequency, these timestamps correspond to 20 milliseconds, 40 milliseconds, 60 milliseconds, etc. At the same time a clock in the terminal platform can measure the time when the packets arrive. The terminal platform clock may read (for example) one hour, four minutes, and 400 milliseconds for the first packet; one hour, four minutes, and 423 milliseconds for the second packet; one hour, four minutes, and 445 milliseconds for the third packet; and so forth. thus, when receiving the first packet, the end-to-end delay may be considered to be [(one hour, four minutes, and 400 milliseconds)−20 milliseconds] =one hour, four minutes, and 380 milliseconds. Making a similar calculation for all packets and subtracting one hour, four minutes, and 380 milliseconds leaves 0 milliseconds, 3 milliseconds, 5 milliseconds, which is the jitter for which the jitter buffer 40 should provide protection.

Figure 4:
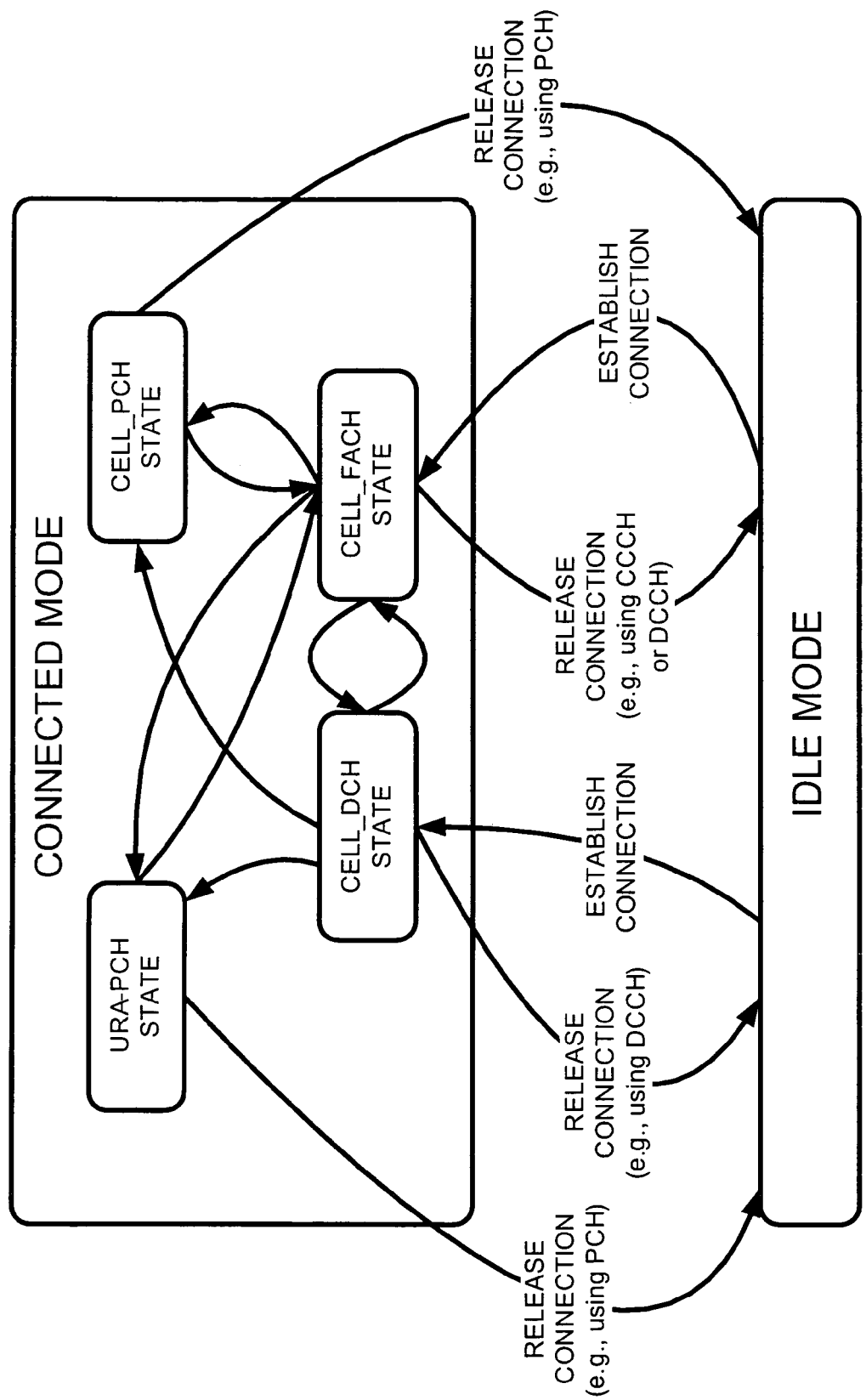
FIG. 4 is a diagrammatic view showing various modes and states of a wireless terminal.

Thus, the jitter buffer 40 with its plural playback pointers, maintained and operated as above summarized, solves many problems including the three problem situations previously discussed. Solution of the first problem situation is exemplified by an audio session (VoIP) over WCDMA with PS-RAB. If the radio channel that the wireless terminal 30 camps on when starting to send media is the CELL_FACH (see FIG. 4), the RTP transmission will start on the common channel and then switch over to the dedicated channel (CELL_DCH). This channel switch (e.g., switch from common channel to dedicated channel) takes a certain amount of time during which media transfer is stopped. Therefore the playback point needs to be set rather high, for which reason playback pointer2 of FIG. 3 can be used to avoid a gap in the played audio.

If wireless terminal 30 resides on the dedicated channel when the media transfer starts, no time consuming channel switch is needed. Therefore, the playback point can be set low, i.e. by use of playback pointer1 in FIG. 3. The reason playback pointer1 can be used is that the "natural" jitter in the dedicated channel will be much lower than the jitter created by the channel switch. So if playback pointer2 were used, then the end-to-end audio delay becomes unnecessary long.

The choice of which playback point to use can in this example be made by calculating the time since the last media transfer. The reason for this is that a channel switch (back to the common channel) is performed a certain amount of time, $t_{downswitch}$, after the last media transmission. So by keeping track of the time after the latest transmission, $t_{last\_media}$, the algorithm or logic that selects which playback pointer is the operative playback pointer is reflected by the following Strategy 1:

Strategy 1:
use playback pointer1 if $t_{last\_media} < t_{downswitch}$,
use playback pointer2 if $t_{last\_media} > t_{downswitch}$, As used herein, $t_{last\_media}$ is a time elapsed between comparable reference points (e.g., beginning point or endpoint) of two consecutive packet transmissions. For example, when a first packet is sent or received, a first clock time is noted with reference to a system clock. Subsequently, when a next or second packet is sent or received, a second clock time is noted with reference to the system clock. The difference between these two measurements (e.g., the difference between the first clock time and the second clock time) is the value of $t_{last\_media}$. Thus, during relative continuous transmission, the value of $t_{last\_media\_wmay}$ may be about 20 milliseconds for voice. But after a talk burst ceases, it may be a while before a new talk burst begins, with the result that the value of $t_{last\_media\_wmay}$ may be about 10 seconds. The quantity $t_{downswitch}$, on the other hand, is a threshold value. In the radio layer of UMTS, for example, there is a timer that controls channel switching. What is sought in PoC over UMTS is to obtain this timer value for use as the value of $t_{downswitch}$. If this UMTS radio layer timer has not expired when sending a next data packet, there will be no channel switching and the transfer time variation will be rather short, which implies that only a small jitter buffer is needed. But if the UMTS radio layer timer has expired, a talk burst will trigger a channel switch, which means an interruption in the speech. The UMTS radio layer timer expired situation requires more extensive buffering. The $t_{downswitch}$ threshold may be preconfigured, signaled, or measured. For example, the remote terminal may be preconfigured so that the $t_{downswitch}$ threshold is set for one second. So in the first of the two cases described above, when the talk burst the 20 milliseconds for $t_{last\_media}$ is less than the one second $t_{downswitch}$ threshold, playback pointer1 is utilized. In the second of the two cases described above, ten seconds is greater than the one second $t_{downswitch}$ threshold, so that playback pointer2 is utilized.

As a variation, it is possible to replace the measurement of time with layer 2 interfaces to the radio. Layer 2 information is exchanged in the radio signaling. In some implementations the $t_{downswitch}$ timer value can be signaled to the remote terminal (e.g. over the air interface). In other implementations, the value of the $t_{downswitch}$ has to be measured or preconfigured.

The jitter buffer 40 with its plural playback pointers also addresses the second problem situation previously discussed. Recall that in the second problem situation the SDP-parameter "ptime" (packet time) describes the amount of time the playback of the media in the IP packet will take, and that a change in the ptime parameter may affect frequency of media reception as well as amount of media. The ptime parameter is part of the SDP protocol which is sent in SIP messages during session set-up for the service. In this second problem situation, playback pointer1 can be utilized as the operative playback pointer when the value of ptime is a lower number (such as 20). On the other hand, playback pointer2 can be utilized as the operative playback pointer when the value of ptime is a higher number (such as 160). In such case, the algorithm or logic that selects playback pointer is reflected by Strategy 2:

Strategy 2:
use playback pointer1 if ptime=low (e.g., 20)
use playback pointer2 if ptime=high (e.g., 160)

The jitter buffer 40 with its plural playback pointers also addresses the third problem situation previously discussed. Recall that in the third problem situation a first type of media (e.g., audio or voice) is being received and then another type of media (e.g., video) is also received, and that video typically requires longer buffering time than voice. The playback pointer1 can be used when only audio is being received, whereas playback pointer2 can be used for the audio buffer when the audio is combined with e.g. video. The algorithm or logic that selects which playback pointer is the operative playback pointer is reflected by the following Strategy 3:

Strategy 3:
use playback pointer1 if only audio
use playback pointer2 if audio+video As explained and illustrated above, each playback point can be continuously estimated and updated using one or several input parameters. The continuous update of one of the playback point mentioned may be performed always, or only when receiving media, or only when the media buffer is operating using that specific playback point.

The input parameters used for estimating the playback points may be estimated intervals of experienced path of transfer delays, media type and/or combination of media types, service combinations such as VoIP and Presence and interactions with lower radio specific layers in the terminal.

The playback pointer selector 112 selects which playback point to use at every point in time. In so doing, playback pointer selector 112 can use an algorithm that is also dependent on several input parameters. The input parameters can be, for example, layer 2 interactions, the media type, media settings (e.g. ptime), the service type and time.

The structure and operation described above improves the end-to-end (E2E) content delivery performance. As the media path of transfer is not static, and ordinary adaptive jitter buffer solutions neither catch the drastic change nor set the playback/rendering point to an outliner point. The latter would unnecessary decreases the crucial (especially for PoC) E2E experienced content delivery time.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A terminal which receives transmissions in a form of a media stream, the terminal comprising:
   a memory comprising jitter buffer which receives data comprising the media stream;
   a computer-implemented buffer manager configured to make a selection between plural playback pointers as an operative playback pointer from which the data comprising the media stream is played out of the jitter buffer;
   wherein the media stream is acquired by the terminal at different times over channels of different channel type, and wherein the buffer manager is configured to make the selection between the plural playback pointers as the operative playback pointer based on the channel type of the channel which is carrying the media stream;
   wherein the terminal is a wireless terminal, and wherein the buffer manager is configured to use a first of the plural playback pointers for play out of the media stream when the media stream is acquired over a dedicated channel and uses a second of the plural playback pointers for play out of the media stream when the media stream is acquired over a common channel;
   wherein the buffer manager is configured to select between the first of the plural playback pointers and the second of the plural playback pointers by calculating a time since a last media transfer; and
   wherein the buffer manager is configured to use the first of the plural playback pointers if $t_{last\_media} < t_{downswitch}$ or using a second of the plural playback pointers if $t_{last\_media} > t_{downswitch}$, wherein $t_{downswitch}$ is a channel switch threshold and $t_{last\_media}$ is a time elapsed between comparable reference points of two consecutive packet transmissions.

2. The terminal of claim 1, wherein the buffer manager is configured to update at least one of the plural playback pointers.

3. The terminal of claim 2, wherein the buffer manager is configured to update the at least one of the plural playback pointers when the jitter buffer is receiving data comprising the media stream.

4. The terminal of claim 2, wherein the buffer manager is configured to update the at least one of the plural playback pointers when the at least one of the plural playback pointers is the operative playback pointer.

5. The terminal of claim 2, wherein the buffer manager is configured to update the at least one of the plural playback pointers as a function of at least one of: (1) estimated intervals of experienced path of transfer delays; (2) media type; (3) combination of media types; (4) services combinations.

6. The terminal of claim 1, wherein the buffer manager is configured to set the first of the playback pointers with input from an estimated jitter during a talk-burst considering the jitter.

7. The terminal of claim 1, wherein the buffer manager is configured to set the first of the playback pointers using a time of arrival and an RTP timestamp of frames of the media stream.

8. The terminal of claim 1, wherein the buffer manager is configured to set the second of the playback pointers using an estimation of a channel-switch.

9. The terminal of claim 1, wherein the terminal is a wireless terminal that receives the media stream across a radio interface.

10. The terminal of claim 1, wherein the terminal is a wireline terminal.

11. A method of operating a terminal comprising:
    receiving transmissions in a form of a media stream by the terminal acquiring the media stream at different times over a dedicated channel and a common channel;
    storing the data comprising the media stream in a jitter buffer;
    making a selection between plural playback pointers as an operative playback pointer from which the data comprising the media stream is played out of the jitter buffer;
    wherein making the selection comprises
      calculating a time since a last media transfer;
      using the first of the plural playback pointers if $t_{last\_media} < t_{downswitch}$ or using a second of the plural playback pointers if $t_{last\_media} > t_{downswitch}$, wherein $t_{downswitch}$ is a channel switch threshold and $t_{last\_media}$ is a time elapsed between comparable reference points of two consecutive packet transmissions;
    reading out the data comprising the media stream from the jitter buffer at the operative playback pointer by:
      using a first of the plural playback pointers for play out of the media stream when the media stream is acquired over the dedicated channel;
      using a second of the plural playback pointers for play out of the media stream when the media stream is acquired over the common channel.

12. The method of claim 11, further comprising updating at least one of the plural playback pointers.

13. The method of claim 12, further comprising updating the at least one of the plural playback pointers when the jitter buffer is receiving data comprising the media stream.

14. The method of claim 12, further comprising updating the at least one of the plural playback pointers when the at least one of the plural playback pointers is the operative playback pointer.

15. The method of claim 12, further comprising updating the at least one of the plural playback pointers as a function of at least one of: (1) estimated intervals of experienced path of transfer delays; (2) media type; (3) combination of media types; (4) services combinations.

16. The method of claim 11, further comprising setting the first of the playback pointers with input from an estimated jitter during a talk-burst considering the jitter.

17. The method of claim 11, further comprising setting the first of the playback pointers using a time of arrival and an RTP timestamp of frames of the media stream.

18. The method of claim 11, further comprising setting the second of the playback pointers using an estimation of a channel-switch.

19. The method of claim 13, wherein the terminal is a wireless terminal that receives the media stream across a radio interface.

20. The method of claim 13, wherein the terminal is a wireline terminal.

* * * * *

UNITED STATES PATENT AND TRADEMARK OFFICE
CERTIFICATE OF CORRECTION

| | | |
|---|---|---|
| PATENT NO. | : 7,970,020 B2 | Page 1 of 1 |
| APPLICATION NO. | : 10/974029 | |
| DATED | : June 28, 2011 | |
| INVENTOR(S) | : Hannu et al. | |

It is certified that error appears in the above-identified patent and that said Letters Patent is hereby corrected as shown below:

In Column 3, Line 59, delete "stream" and insert -- stream. --, therefor.

In Column 4, Line 63, delete "an a" and insert -- a --, therefor.

In Column 5, Line 45, delete "GRPS" and insert -- GPRS --, therefor.

In Column 5, Line 48, delete "GRPS" and insert -- GPRS --, therefor.

In Column 5, Line 51, delete "GRPS" and insert -- GPRS --, therefor.

In Column 5, Line 63, delete "GRPS" and insert -- GPRS --, therefor.

In Column 11, Line 1, delete "thus," and insert -- Thus, --, therefor.

In Column 11, Line 43, delete "$t_{downswitch}$," and insert -- $t_{downswitch}.$ --, therefor.

In Column 14, Line 29, in Claim 11, delete "transmissions;" and insert -- transmissions; and --, therefor.

In Column 14, Line 61, in Claim 19, delete "13" and insert -- 11 --, therefor.

In Column 14, Line 64, in Claim 20, delete "13" and insert -- 11 --, therefor.

Signed and Sealed this
Twenty-seventh Day of December, 2011

David J. Kappos
*Director of the United States Patent and Trademark Office*